United States Patent [19]

Kunz

[11] 4,264,664

[45] Apr. 28, 1981

[54] METAL-COATED PLASTIC FOIL AND ITS USE

[76] Inventor: Kurt Kunz, Hauptstrasse 89, 8255 Schlattingen, Switzerland

[21] Appl. No.: 50,303

[22] Filed: Jun. 20, 1979

Related U.S. Application Data

[63] Continuation-in-part of Ser. No. 948,576, Oct. 4, 1978, abandoned.

[30] Foreign Application Priority Data

Jan. 26, 1978 [DE] Fed. Rep. of Germany ....... 2803299

[51] Int. Cl.[3] .......................... A47G 5/02; A47G 5/04; A47H 23/00; B32B 15/04

[52] U.S. Cl. .................................... 428/142; 160/238; 428/163; 428/164; 428/209; 428/906; 428/913; 428/920

[58] Field of Search ............... 428/142, 156, 163, 164, 428/167, 182, 184, 209, 242, 457, 913, 906, 920; 160/238

[56] References Cited

U.S. PATENT DOCUMENTS

| | | | |
|---|---|---|---|
| 1,911,232 | 5/1933 | Large | 160/266 |
| 2,746,892 | 5/1956 | Elfving | 428/185 X |
| 2,874,612 | 2/1959 | Luboshez | 160/238 X |
| 2,882,413 | 4/1959 | Vingerhoets | 250/80 |
| 3,166,800 | 1/1965 | Zoldok | 428/906 X |
| 3,505,159 | 4/1970 | Winter | 428/164 |
| 3,510,388 | 5/1970 | Hunt et al. | 428/164 |
| 4,077,168 | 3/1978 | Smith | 428/464 X |
| 4,138,515 | 2/1979 | Dial | 428/163 X |
| 4,158,718 | 6/1979 | Kehl et al. | 428/913 X |
| 4,172,164 | 10/1979 | Meyer et al. | 428/182 X |

*Primary Examiner*—Harold Ansher

[57] ABSTRACT

A metal-coated plastic foil is formed from a plastics material and is embossed in a pattern adapted to reflect diffusely incident light which impinges thereon.

18 Claims, 16 Drawing Figures

METAL-COATED PLASTIC FOIL AND ITS USE

This is a continuation-in-part of U.S. Patent Application Ser. No. 948,576 filed Oct. 4, 1978, now abandoned, and claims the effective date thereof for all commonly disclosed subject matter.

BACKGROUND OF THE INVENTION

The present invention relates to metal-coated foil and to curtains which incorporate such foil.

It has been known heretofore to employ metal-coated foil to reflect heat and light rays and thereby control the temperature in a building. Thus, in the summer months, the rays of heat and light may be reflected away from the building. Whereas, in the winter months, such rays may be permitted to enter the building.

The conventional manner of utilizing metal-coated foil in the past has been to adhesively secure the foil over all or selected window areas of the structure or to selected window shades. In the first instance, it was found that incident light whether it be natural or artificial was focused by the foil and reflected outwardly of the structure in a manner such that frequently pedestrians and the drivers of vehicles were temporarily blinded. The result, of course, was the undesirable and inadvertent creation of traffic hazards. In the latter instance, i.e. when the foils were secured to window shades so as to be movable therewith, waves of light were produced which caused a variety of reflected moving images to be created. The net result was an adverse effect upon the esthetic appearance of the building with little or no reduction in glare.

It is, therefore, one object of this invention to provide metal-coated plastic foil which is capable of reflecting diffusely incident light which impinges thereon, whereby the foil may or may not be translucent within the range of visible light.

It is another object of the invention to provide metal-coated plastic foil which reflects incident light in a directionally controlled manner.

It is a further object of the invention to provide a curtain structure which incorporates metal-coated plastic foil of the character described so as to enable improved control over the reflectance of heat and light rays and thereby over temperature conditions within a building.

Other objects and advantages of the invention will become readily apparent to persons skilled in the art from the ensuing description.

SUMMARY OF THE INVENTION

In accordance with the present invention, there is provided a metal-coated foil formed from a plastic material the foil being embossed in a pattern so that the foil in cross-section, has embossments whose sides are bent up and down out of the plane of the foil on each of its surfaces.

In accordance with the present invention, there is also provided a heat reflective curtain comprising feeding means and a metal-coated foil formed from a plastic material carried thereby, the foil being embossed in a pattern so that the foil appears in cross-section to have embossments wherein the sides thereof extend, bent or formed out of the plane of the foil on both surfaces.

BRIEF DESCRIPTION OF THE DRAWINGS

In order that the invention may be more fully comprehended, it will now be described by specific examples with reference to the accompanying drawings in which.

DESCRIPTION OF THE PREFERRED EMBODIMENTS

Figure 1:
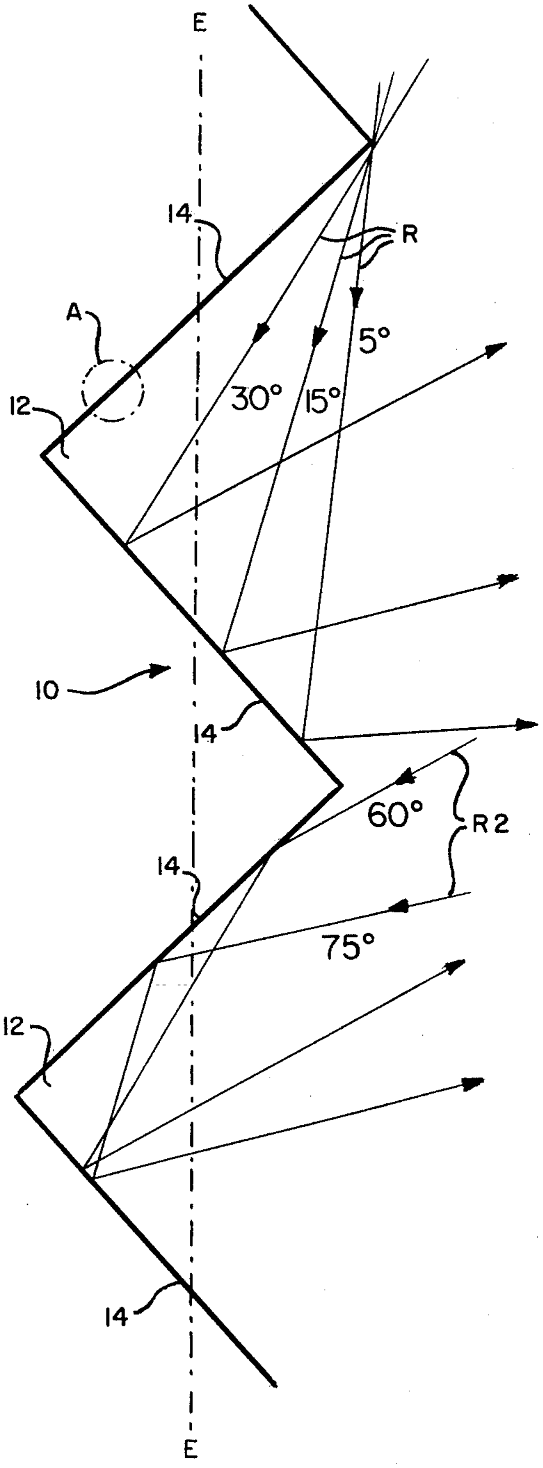
FIG. 1 is a side view of the metal-coated plastic foil showing incident and reflected rays of light.
Figure 2:
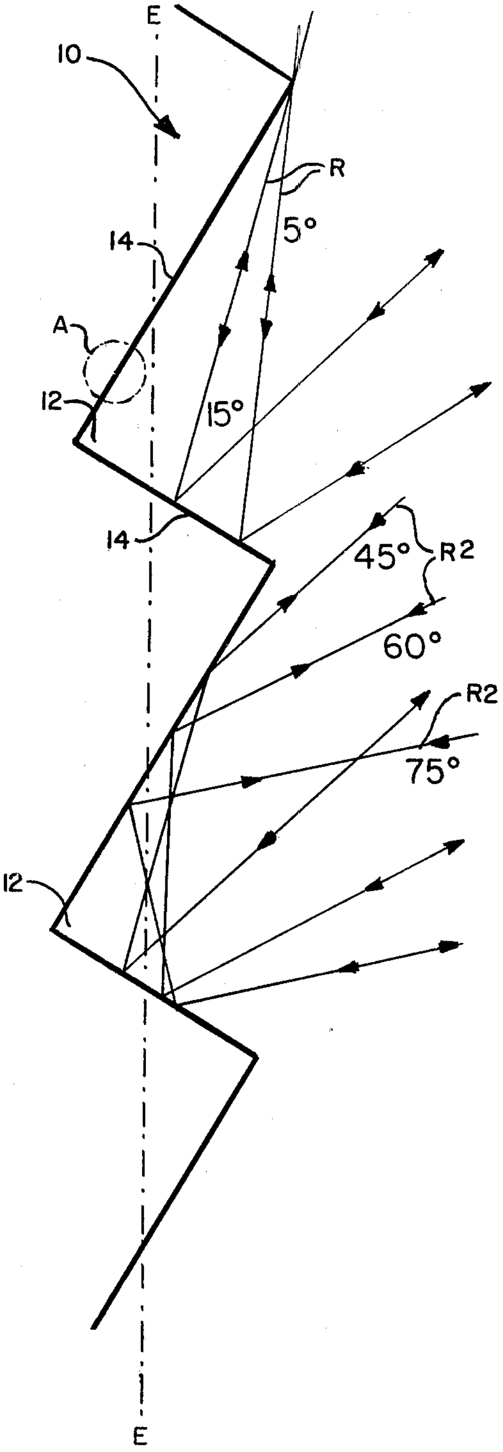
FIG. 2 is a view similar to that of FIG. 1 and illustrating a modified form of foil.

Referring to FIGS. 1 and 2, there is shown generally, as indicated by reference numeral 10, a metal-coated foil formed from a plastic material. It will be observed that the foil has been embossed or deformed so as to have a series of V-grooves 12, such grooves desirably extending in parallel relationship. The sides 14 of each of the grooves may be of equal length as depicted in FIG. 1 so that if a line were to be drawn, between the outer extremities of the sides of each V-groove, there would be produced a series of equal-sided right triangles. Alternatively, as shown in FIG. 2, the sides of all or of selected ones of such grooves may be unequal. The sides of the V-grooves define an interior angle which is substantially 90° in each of such V-groove embossing patterns and intersect the central plane of the foil indicated by the dotted line E so that portions are bent both upwards and downwards of the plane. It will be observed that rays R of incident light or heat which impinge upon the foil will be diffusely reflected thereby preventing the focussing of images and avoiding the creation of a blinding glare as is customary with prior art foils. Desirably, the foil is embossed so as to ensure that the more horizontal, and therefore directly focused into the window, rays are reflected at least twice as exemplified in FIGS. 1 and 2 by rays $R_2$.

It is contemplated that when the foil of FIG. 1 or of FIG. 2 is positioned on a window surface such that the apex of V-grovves extend substantially horizontally, the incident rays of light or of heat will be reflected in a generally upwardly direction as indicated by the arrowheads in such figures. There will, thus, be little or no reflection of light downwardly or horizontally which can result in the blinding of vehicular drivers. In FIG. 1, the angular orientation of the rays of incident light relative to the vertical are shown.

Figure 3:
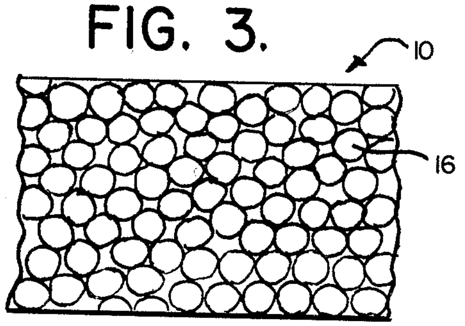
FIG. 3 is a plan view showing another foil construction.
Figure 5A:
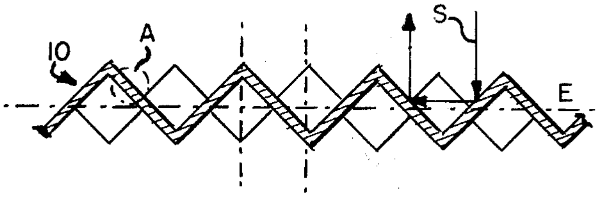
FIG. 5*a* is a side elevational view, partly cross-section of a foil as shown in FIG. 3 having a conical or pyramidal embossing pattern.
Figure 5B:
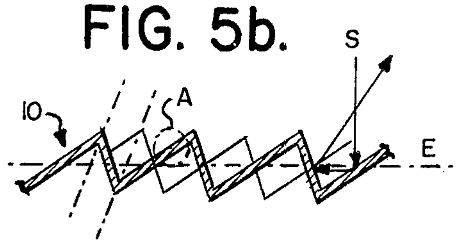
FIG. 5*b* is a side elevational view, partly cross-section of a foil as shown in FIG. 3 having an inclined conical or pyramidal embossing pattern.

Referring to FIG. 3, another embodiment of the foil 10 is shown which is provided with a relative irregular pattern of embossing each embossment may be defined as being selfcontained. Thus, a series of recesses 16 may be formed in the foil. Such recesses lie generally in the plane of the foil and are circumscribed by up-standing walls, which intersect the central plane of the foil so that some part of the foil is embossed upwards and some part downwards out of the plane on both surfaces. As depicted in FIG. 5*a* a pyramidal or conical embossing pattern may be formed although it will be understood that the particular specific embossment is not critical as long as they provide the bent up and down portions resulting in the desired reflection of incident light and heat rays which impinge upon the foil. Thus, patterns of truncated cones, spherical dimples or caps, pyramids, truncated pyramids, etc., may be employed to advantage. The axes of symmetry of the elements in the embossed pattern extend generally perpendicular to the plane E of the foil, although such axes may be inclined obliquely relative to the foil plane as shown in FIG. 5*b* depending upon the intended directional control desired for the reflected light as shown at S. In the latter instance, there is taken into account the different directions which the incident light impinges upon the foil.

Figure 4:
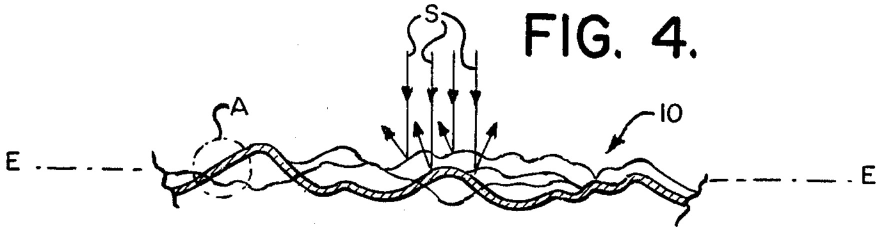
FIG. 4 is a side elevational view, partly cross-section of a foil having an irregularly embossed pattern.

As shown in FIG. 4 the embossing pattern may be formed irregularly to show a structure such as is known, for example, from the thick application of wall paint. Here, random embossment is made, but portions thereof extend above and portions extend out of the central plane E on both surfaces, so that incident light S is diffusely reflected at random and thus uniformly in all directions.

Figure 6A:
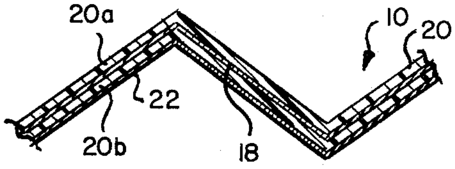
FIG. 6*a* is a fragmentary side elevational view of a plastic foil embodying the features of the invention and consisting of double-foil layer having a metal layer interposed therebetween, and with regular embossing pattern.
Figure 6B:
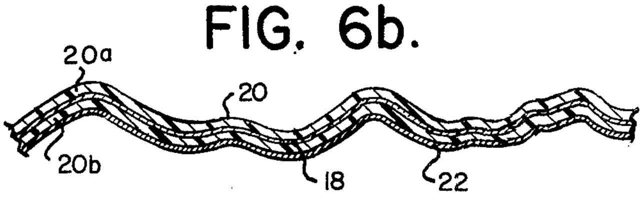
FIG. 6*b* is a fragmentary side elevational view of a plastic foil embodying the features of the invention and consisting of double-foil layer having a metal layer interposed therebetween, and with irregular embossing pattern.
Figure 7A:
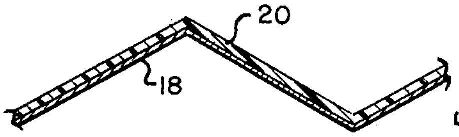
FIG. 7*a* is a fragmentary side elevational view of a plastic foil embodying the features of the invention and consisting of a single foil layer having a metal layer thereon, and with regular embossing pattern.
Figure 7B:
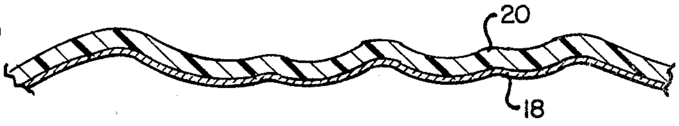
FIG. 7*b* is a fragmentary side elevational view of a plastic foil embodying the features of the invention and consisting of a single foil layer having a metal layer thereon, and with irregular embossing pattern.
Figure 8A:
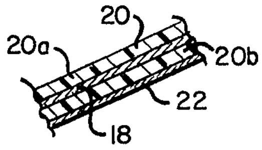
FIG. 8*a* is an enlarged view of the metal-coated foil isolated by inset A of FIGS. 1, 2, 4, 5*a* or 5*b*, and in double-foil layer structure.
Figure 8B:
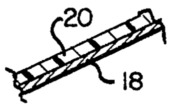
FIG. 8*b* is an enlarged view of the metal-coated foil isolated by inset A of FIGS. 1, 2, 4, 5*a* or 5*b*, and in single-foil layer structure.

Turning to FIGS. 6–8, various forms of coated foil are shown, each applicable for use in the structure described. The basic structure of the foil is shown in FIG. 7*a*, 7*b* and 8*b*, comprising a plastic base sheet 20 with metal-coating 18. Since such foil may be susceptible to mechanical damage, such as scratching, pealing, etc., the base sheet 20, as shown in FIG. 6*a*, 6*b* and 8*a* may be given a coating of metal 18 on its surface and a protective layer of varnish 22 thereover. Alternatively, as also seen in FIG. 6*a*, 6*b* and 8*a*, a foil consisting of double sheets 20*a*, 20*b* may be provided having the metal-coating 18 disposed between the sheet layers.

FIG. 7*a* shows a foil with a regular embossment pattern, which foil is formed only of a sheet 20 and a metal coating 18. FIG. 7*b* shows a similar structure having irregular embossment pattern. FIG. 6*a* shows a foil in a regular embossment pattern with protective varnish and in a double layer structure; FIG. 6*b* shows the same foil with irregular embossment pattern. It will, of course, be appreciated that three or more layers of sheets with metal-coating interposed therebetween may be utilized to form the foil as will be described with reference to FIG. 10.

Figure 9A:
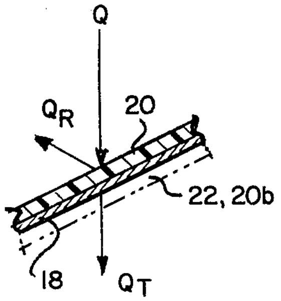
FIG. 9*a* is an enlarged view of the metal-coated foil, either double or single structural, being translucent for visible light.

FIG. 9*a* shows a foil formed of a sheet 20 with metal-coating 18 or, in the phantom line structure, the metal-coated sheet 20 (or a double sheet foil) and protective layer of varnish 22. As a result of this multi-layered construction selective reflection can be obtained so that for example incoming ambient light Q within a defined wave length band is separated, permitting the transmission of a great amount of light $Q_T$ through the foil, and the reflection of only a small amount, $Q_R$. This foil may thus be made translucent for the radiation in the desired wave length band, which may expecially be selected as the band of visible light but opaque to the harsh heat rays or the like.

Figure 9B:
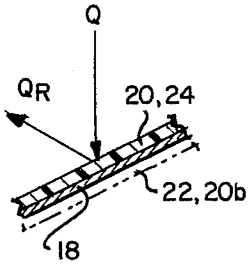
FIG. 9*b* is an enlarged view of the metal-coated foil, either double or single structural, not being translucent for visible light.

FIG. 9*b* shows a foil with the structure similar to FIG. 9*a* which reflects on the other hand practically all light in a desired wave-length band, for instance the visible light.

Thus the foil can be employed for the reflection of heat and light rays to thereby contribute to the maintenance of a temperature-controlled region within a building. Alternatively, the foil can be made so as to be translucent within the range of visible light so as to permit the penetration therethrough of a selected range of light rays.

Figure 10:
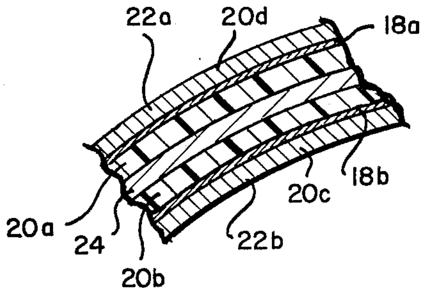
FIG. 10 is an enlarged view of a metal-coated foil, isolated by inset A of FIGS. 1, 2, 4, 5*a* or 5*b*, and in multi-layer structure.

FIG. 10 shows a multi-layer foil structure which is embossed with any one of the previously described patterns. It comprises a first and second sheet layer 20*a* and 20*b* with metal coatings 18*a* and 18*b* on opposite sides. A carrier layer 24, preferably of cellulose, fibrous fleece-like material is interposed between the foils 20*a* and 20*b*. The metal-coatings 18*a* and 18*b* are protected by a protective varnish 22*a*, 22*b* or additional layers 20*c*, 20*d*.

Figure 11:
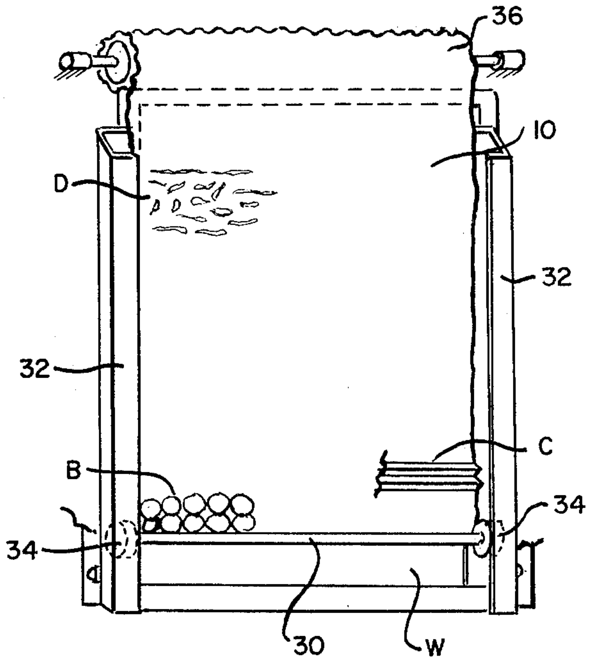
FIG. 11 is an end view of a heat-reflecting curtain constructed in accordance with the invention.

FIG. 11 shows an embossed foil 10, either with embossing pattern of FIG. 3 as shown in area B or of FIG. 1 or 2 as shown in area C or of FIGS. 4, 6*b*, 7*b* as shown in area D, or any of the previously described pattern, according to the reflection/transmittance effect desired. The foil 10 is fixed to an end-bar 30 which is guided in side rails 32, e.g., by means of rolls 34. The foil 10 is wound on a roller 36 which acts as feeding means for the foil 10 which is movable relative to a window W.

Although the metal-coated foil is flexible, being formed of thin sheets of plastic coated with relatively thin layers of metal, embossing of the foil increases its inherent stability. The specific patterns being form-stable at least substantially determines the nature of the increased stability as well as the direction of such stability. Thus, when the foil is arranged on the exterior surface of a window and is subjected to wind forces, such increase in inherent stability is of importance and contributes to the structural strength of the foil. As stated previously, selection of the particular pattern of embossing will enable a predetermined resolution of the reflected images as well as directional control of the reflected light. Where multiple ray reflection is achieved as depicted by rays $R_2$ in FIGS. 1 and 2, the result is a dampening of the reflected light.

Although several embodiments and variations have been suggested herein, others will be obvious to those skilled in this art. Accordingly, the present disclosure should be taken as illustrative only and not as limiting of the scope of this invention.

What is claimed:

1. A flexible foil comprising a carrier layer of plastic material, being embossed in a pattern of substantially form-stable recesses, each of said recesses having in cross-section, sides bent from the central plane to extend outwardly from each of the surfaces of the carrier layer and a thinner coating of metal applied to the carrier layer on at least one of the surfaces of said carrier layer and said recesses.

2. A foil according to claim 1, comprising at least two superimposed carrier layers with the film of metal interposed therebetween.

3. A foil according to claim 1, having a metal coating on opposite sides of the carrier layer.

4. A foil according to claims 1 or 3, including a protective coating of varnish applied on the metal coating.

5. A foil according to claim 1, 2, or 4 which is translucent within a selected range of light.

6. A foil according to claims 1, 2, 3, or 4, wherein said embossed pattern is irregular.

7. A foil according to claims 1, 2, or 4, wherein said embossed pattern comprises a plurality of deformations which are substantially axially symmetrical.

8. A foil according to claim 1, wherein said embossment forms deformations which are substantially pyramidal in configuration.

9. A foil according to claim 1, wherein the embossment forms deformations, which are substantially normal to the plane of the foil.

10. A foil according to claim 7, wherein the embossment forms deformations, the axes of said deformations forming an oblique angle with the plane of the foil.

11. A foil according to claim 1, wherein said embossed pattern comprises a series of V-grooves formed in the foil.

12. A foil according to claim 11, wherein said V-grooves extend in parallel relationship to each other.

13. A foil according to claim 12, wherein the surfaces of the foil which form the sides of said V-grooves are of equal lengths.

14. A foil according to claim 12, wherein the surfaces of the foil which form the sides of said V-grooves are of unequal lengths.

15. A foil according to claim 13, wherein the intersected angles of said V-grooves is at least substantially 90°.

16. A foil according to claims 1, 3, or 4, wherein the pattern of embossing is selected to reflect the major portions of incident light in a predetermined range of directions.

17. A foil according to claims 1, 3, or 4, being flexible, wherein the pattern is substantially form-stable.

18. A foil according to claims 1, 3, or 4, wherein the pattern of embossing is selected to effect reflection of the incident light rays at least twice within such pattern.

* * * * *